(No Model.)  3 Sheets—Sheet 2.
E. F. STODDARD.
COMBINED HORSE RAKE AND TEDDER.
No. 322,136. Patented July 14, 1885.
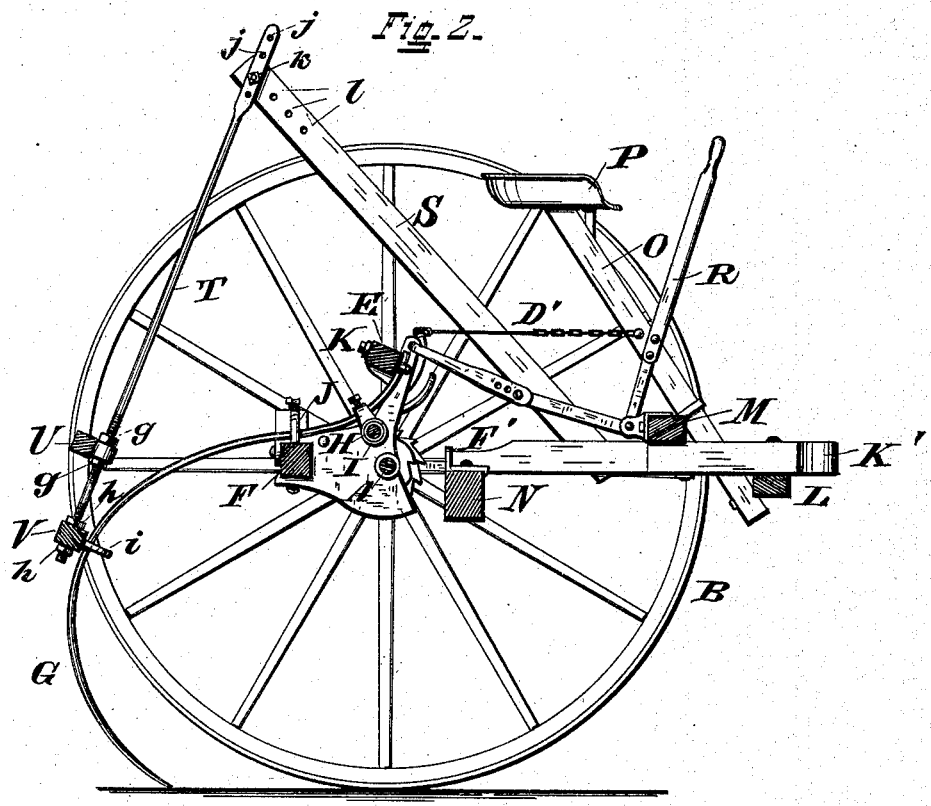
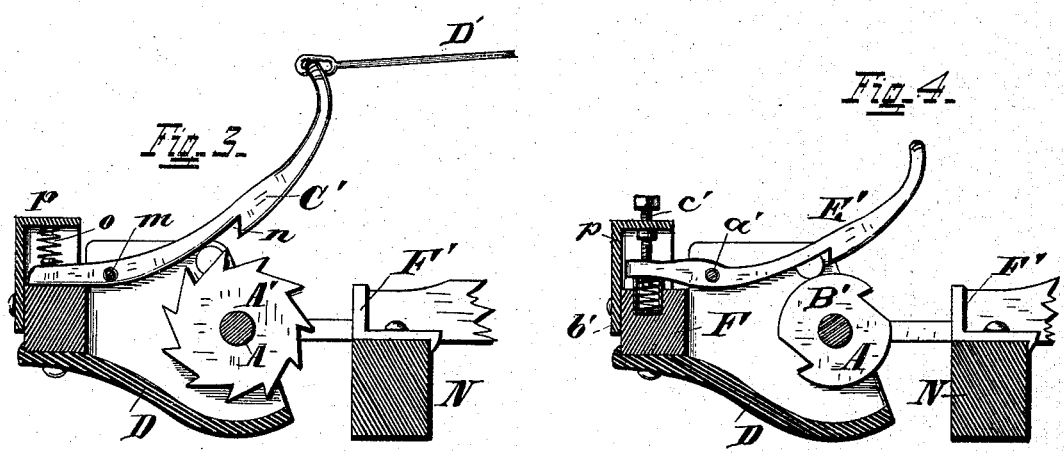
Attest
Carl Spengel
E. W. Rector
Inventor
E. Fowler Stoddard
by Stem & Eck Atty's (No Model.)  3 Sheets—Sheet 3.
E. F. STODDARD.
COMBINED HORSE RAKE AND TEDDER.
No. 322,136. Patented July 14, 1885.
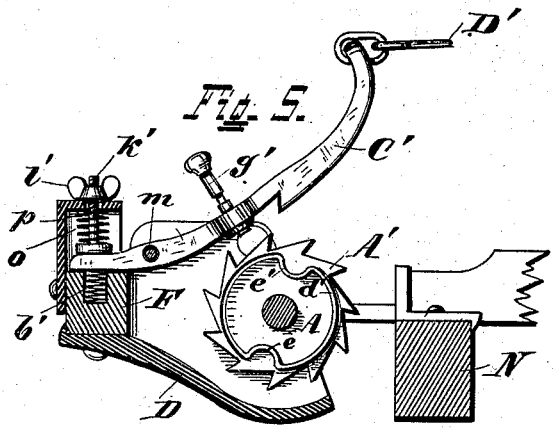
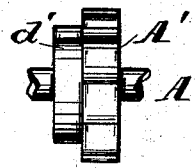
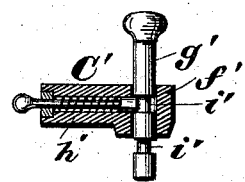
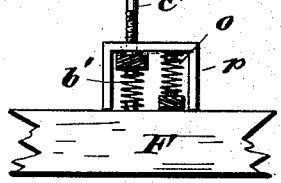
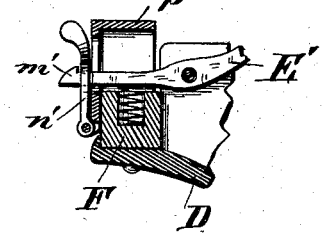
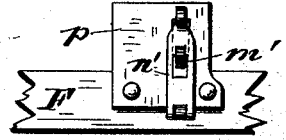
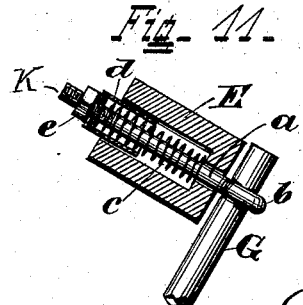
Attest
Carl Spengel
E. W. Reeton
Inventor
E. Forder Stoddard
by Stunt Peck Atty's

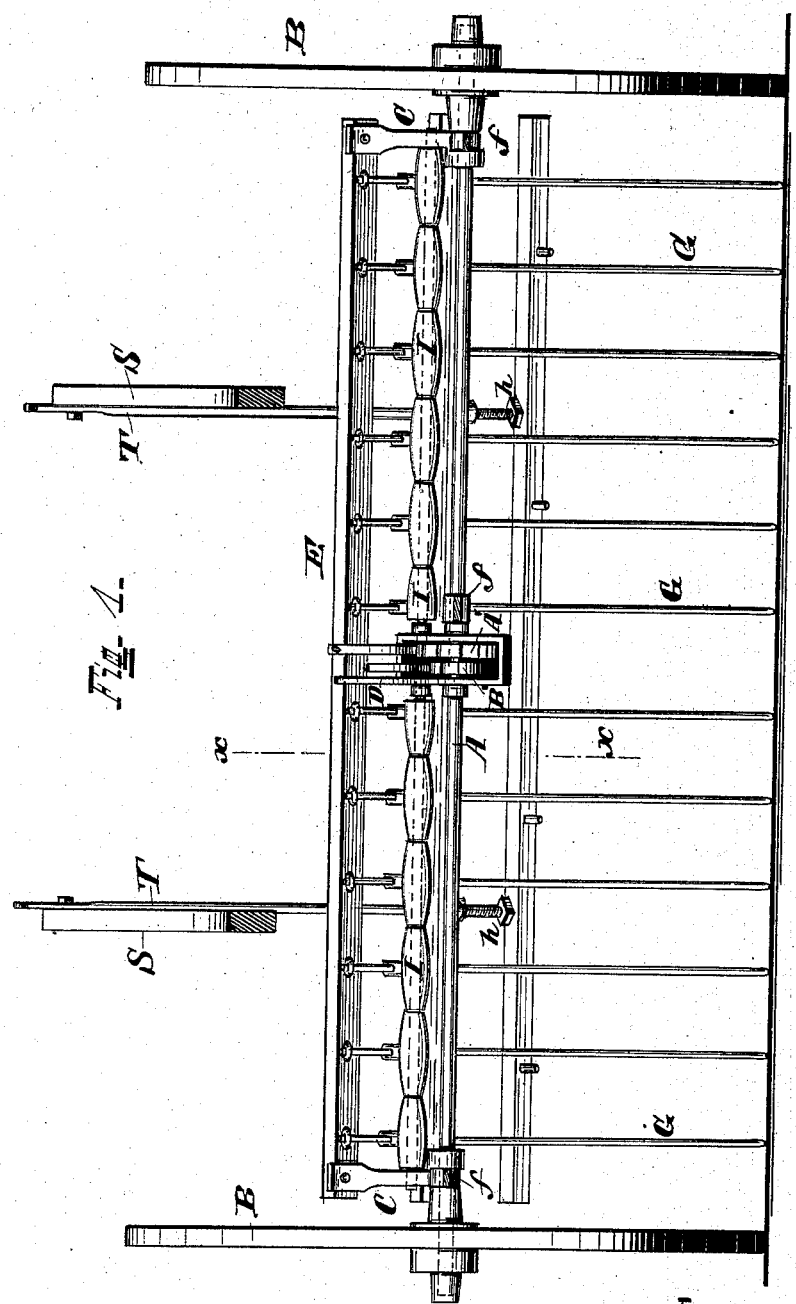

UNITED STATES PATENT OFFICE.

E. FOWLER STODDARD, OF DAYTON, OHIO.

COMBINED HORSE RAKE AND TEDDER.

SPECIFICATION forming part of Letters Patent No. 322,136, dated July 14, 1885.

Application filed August 22, 1884. (No model.)

*To all whom it may concern:*

Be it known that I, E. FOWLER STODDARD, a citizen of the United States, residing at Dayton, in the county of Montgomery and State of Ohio, have invented certain new and useful Improvements in Combined Horse Rakes and Tedders, of which the following is a full, clear, and exact description, reference being had to the accompanying drawings, forming a part of this specification.

The object of my invention is to combine in one machine a first-class rake and tedder having but a single set of teeth for both raking and tedding without materially adding to the cost of a first-class rake; and it relates to that class of machines known as "draft-dumpers," in which the traction of the wheels is employed at the will of the operator to elevate the teeth entirely, to discharge the collected load in raking, or partially, to gather up and turn over the hay in tedding and this while the machine is either going forward in a straight line or is in the act of turning in either direction.
The novelty of my invention will be herein set forth, and distinctly pointed out in the claims.

In the accompanying drawings, Figure 1 is a front elevation of my improved rake and tedder, with the draft-frame and thills removed. Fig. 2 is a side elevation of the machine through the line $x\ x$ of Fig. 1. Fig. 3 is an enlarged detailed view of the dumping-lock mechanism. Fig. 4 is a corresponding view of the tedding-lock mechanism. Fig. 5 is an enlarged detailed view of a modification of the dumping and tedding lock mechanism. Fig. 6 is a front elevation of the lifting-wheel and flange employed in Fig. 5. Fig. 7 is a detailed view of the tedding stop-bolt. Fig. 8 is a rear sectional view of the spring-housing. Fig. 9 is a detailed sectional view in side elevation of a modification of the tedder-dog block. Fig. 10 is a rear elevation of Fig.
9. Fig. 11 is an enlarged sectional detailed view of the spring-guides for the teeth.

The same letters of reference are used to indicate identical parts in all the figures.

In the application of my present invention I preferably employ the leading characteristics of two of the best known and most favorably received rakes—to wit: the Hollingsworth rake, characterized by having the teeth attached to a rocking frame consisting of two or more parallel bars supported upon arms pivoted to the axle, and with the teeth adjustably pivoted so as to be capable of forward or backward adjustment to accommodate them to light or heavy raking; and the Tiger rake, made under the Shireman patent of 1867, and chiefly distinguished as a rake having a continuously-revolving axle which transmits the power of both carrying-wheels to a point at or near the middle of the rake-head, where a lock is effected at the will of the operator between the revolving and oscillating or vibrating parts to cause the elevation of the teeth.

While I preferably use the leading characteristics of the above two rakes, I do not wish to be understood as limiting the application of my invention to these alone, as it may be applied to rakes without the Hollingsworth rocking frame or rakes in which the axle revolves by power applied from either wheel.

In the accompanying drawings, A represents the axle, to which the carrying-wheels B are connected, preferably by ratchets or pawls or clutch mechanism, in such manner that the axle will continuously revolve when the machine is advancing or turning in either direction; or one of the wheels may be keyed or otherwise securely fastened to the axle, and the other may run free, in which event the axle would continuously revolve when the machine was advancing or was turning in that direction which caused the forward travel of the wheel to which it was keyed. Suitably pivoted to the axle A, in this instance by the arms C and hood D, which serve to unite and support its front and rear bars, E and F, is the rocker-frame, to which the teeth G are preferably secured in the following manner: Just over the axle A is a parallel shaft, H, in this instance divided in two parts, parallel to the axle and supported in and by the arms C and hood D, and having strung upon it the thimbles or eye-bearings I, in which the teeth are adjustably clamped, as in the Hollingsworth rake. The teeth pass through staples J on the rear bar, F, are inserted through their respective eye-bearings, and have their forward projecting ends passed through the lower perforated or eyeleted ends of the spring-guides K, the detailed construction of which is shown in Fig. 11, where $a$ is a bolt having its lower end formed into an eye, $b$, for the insertion of the forward end of the tooth, as shown, and passed up through a perforation in the bar E. This perforation extends through the bar and is enlarged on its upper side to receive a coiled spring, $c$. A tubular shell, $d$, is slipped over the bolt $a$ and upper end of the spring $c$, and fits rather snugly in the enlarged bore, as seen, but is free to travel up and down therein to accommodate the play of the tooth. A nut, $e$, upon the upper threaded end of the bolt serves to unite the parts, and by its adjustment to regulate the tension of the spring $c$, as required. In this manner the bolt $a$ is guided uniformly at its upper and lower ends by two bearings, so as to prevent lateral play and consequent binding of the parts.

While I preferably use the supplemental shaft H for the eye-bearings, it is evident that it might be dispensed with, and the eye-bearings might be strung upon the axle A; but in such case there would be more or less wear on the eye-bearings or axle, or both, occasioned by the continuous revolution of the axle, as will be readily understood. In such case, also, the arms C would be so shaped as to bring the bars E F in the same relative position to the axle that they have to the shaft H, so as to accommodate the sweep or forward curve of the teeth.

The platform or draft-frame of the machine may be of the usual or any suitable construction, having the thills K, cross-bars L, M, and N, seat-beam O, and driver's seat P, and it is hinged to the frame preferably at the three points $f$, Fig. 1, so as to support and draw equally upon the axle without tending to bend it or cause it to bind. The machine may be further provided with the usual hand-lever, R, Fig. 2, with its connections with the rake-head for operating the machine by hand in case of breakage of the automatic devices.

Instead of the most usual form of strippers or cleaner-sticks, I employ a novel vibrating adjustable stripper, which rests and rides upon the teeth, and is so formed as to extend to their very extremities to insure the proper removal of the hay without liability of any of the teeth springing over the bar, as sometimes happens in this form of strippers where they are so set as to come near the extremities of the teeth.

By reference to Figs. 1 and 2, my improved construction may be thus described: At the upper ends of two rearwardly-inclined arms, S, secured to the platform, are hung two rods, T, threaded at their lower ends, over which is first slipped a guard-bar, U, held in proper adjustment by nuts $g$, and then the stripper-bar V, likewise held in its adjusted position by nuts $h$, and provided with stripping-teeth $i$, as shown. Further adjustment of the stripper may be had by perforations $j$ in the upper ends of the rods T, in connection with a removable pin or pivot-bolt, or by perforations $l$ in the arms S, or by both sets of perforations, if desired. From this construction it will be seen that by the use of the guard-bar U the stripper-bar V can be set much lower (so as to go even beyond the extremities of the teeth) than it could be if no such device were used, without liability or possibility of the teeth springing over the bar V and becoming locked; for the guard-bar resting on the teeth would so support the rods T and bar V that the teeth could not spring over, and in this way a much more effectual stripping of the teeth can be accomplished; also, by means of the independent adjustment of both bars and the rods the stripper can be adjusted for either tedding or raking and for different kinds of raking, which would require the forward or backward adjustment of the teeth.

In a hood or housing, D, rigidly secured to the rake-head or rocker-frame and encompassing the axle A and shaft H, which have bearings therein, and preferably at or near the middle of the rake-head, are the two lifting-wheels A' B', keyed or otherwise secured to the axle A, so as to revolve therewith when the rake is advancing. The former of these, A', is preferably a ratchet-wheel, as shown, while the latter has fewer teeth or engaging-shoulders, two being generally sufficient.

By reference to Figs. 3 and 4, the details will be more clearly shown.

Pivoted, as at $m$, over the ratchet A' is the locking-dog C', with an engaging hook or shoulder, $n$, which is held out of engagement with the ratchet by any suitable spring, $o$, at its rear end. In this instance the spring is inclosed in a housing, $p$, secured to the bar F. A cord, chain, or link, D', extends from the locking-dog C' to the seat-beam or other part of the frame within easy access of the driver's foot, so that by pressing upon said chain he can cause the dog C' to engage with the ratchet-wheel, whereby a lock is effected between the rake-head and the axle to cause the elevation of the teeth and the discharge of the collected load.

The above is the dumping mechanism.

Over the wheel B' is a second locking-dog, E', pivoted, as at $a'$, and with its rear end extending into the housing, $p$, where it rests upon a spring, $b'$, which may be recessed in the bar F, as shown. While the machine is being used for raking the dog E' is held out of engagement by a set-screw, $c'$, which passes down through the housing $p$, and, bearing against the upper side of the dog, keeps the spring $b'$ compressed.

When it is desired to use the machine as a tedder, it is only necessary to screw up the set-screw $c'$, when the spring $b'$, which is thereby released, throws down the dog E', into engagement with the wheel B', whereupon a lock is effected which causes the partial elevation of the teeth, suitable for tedding at regular intervals—say twice for every revolution of the axle where there are, as in this instance, but two engaging-shoulders on the wheel. Any stop, F', serves to release both dogs C' and E', to cause their disengagement with the lifting-wheels to permit the teeth to fall back to the ground. If desired, there may be two stops, independently adjustable up and down, to regulate the point at which the disengagement of the dogs shall take place, and the consequent degree of elevation of the teeth; or set-screws or equivalent adjustable devices may be placed upon the ends of the dogs to come in contact with a non-adjustable stop for the same purpose. After using the machine as a tedder, and when it is desired to use it as a rake it is only necessary to lock the dog E' out of engagement with the lifting-wheel B'. It is of course evident that the two wheels A' B' may be side by side, and integral if desired; or they may be separate, and the axle A may be cut in two, with one lifting-wheel keyed upon one inner end and the other upon the other inner end, and as far apart or close together as desired, in which event the wheels B would have to be so fastened to the divided ends of the axle, either rigidly or by ratchet and pawl or clutch mechanism, as to cause its forward revolution when the machine is advancing.

As a modification of the above construction, when but one locking-dog can be used for both raking and tedding, I would refer to Figs. 5 and 6, where the lifting-wheel A' has projecting laterally from it a concentric flange, d', with depressions forming recesses e' upon its periphery. The locking-dog C' in this case has a lateral lug, f', through which extends an adjustable or sliding stop-bolt, g', Fig. 7, which may be held up or down by a spring-projected pin, h', engaging with annular recesses i' in the bolt g'. The bolt g' is arranged directly over the flange d' of the lifting-wheel, and when it is desired to use the machine as a tedder it is locked down in the position shown in Fig. 7, so as to ride upon the flange, and when it drops into the recesses i' permits the engagement of the dog with the wheel A', as will be readily understood. In this case, in addition to the spring o, a second weaker spring, b', as seen in Fig. 5, is employed under the end of the dog. The spring o serves to hold down a sliding adjustable bolt, k', which, passing through perforations in the housing p, has screwed upon its upper end a regulating-nut, l'. When the machine is used as a tedder, as above, the bolt k' should be raised to compress the spring o and permit the action of the spring b'; but when the machine is used for raking, the bolt k' is let down so as to release the spring o, which, through the medium of the bolt, holds up the dog C', as seen in Fig. 5. The tedding-bolt g' should also be raised and locked up by means of the pin h'.

It is evident that, instead of the construction shown in Fig. 7, a set-screw may be substituted for the bolt g'. Again, it is evident in this case that the spring b' may be entirely dispensed with, and the spring o need not be compressed by screwing up the bolt; but the driver, by holding his foot constantly upon the chain D', would keep the dog C' under constant pressure to engage with the wheel A' while the machine is being used for tedding, and the bolt g' is locked down, thereby preventing engagement of the dog except when the bolt entered the recesses in the flange d'. Again, instead of the set-screw c', which requires some little time to adjust up and down, the construction shown in Figs. 9 and 10 may be employed, where the rear end of the locking-dog E' extends through a vertical slot in the housing p, and has its projecting end formed in the shape of a hook or catch, m', over which a pivoted latch, n', of any suitable construction, may be slipped to lock up the dog E'.

Having thus fully described my invention, I claim—

1. In a combined rake and tedder, the combination of a single set of teeth for both raking and tedding, a rake-head, and an axle continuously revolving by power applied from either or both wheels, with mechanism whereby the rake-head may be locked to the axle at the will of the operator, to cause the elevation of the teeth for dumping under one condition of adjustment and for tedding under another condition of adjustment.

2. In a combined rake and tedder, the combination of a single set of teeth for both raking and tedding, a rake-head, and an axle continuously revolving by power applied from either or both wheels, with mechanism at or near its middle, whereby the rake-head may be locked to the axle at the will of the operator, to cause the elevation of the teeth for dumping under one condition of adjustment and for tedding under another condition of adjustment.

3. In a combined rake and tedder, the combination of a single set of teeth for both raking and tedding, a rake-head, an axle continuously revolving by power applied from either or both wheels and provided with a lifting-wheel, and mechanism for connecting the rake-head to said lifting-wheel at the will of the operator, to cause the elevation of the teeth for dumping under one condition of adjustment and for tedding under another condition of adjustment.

4. In a combined rake and tedder, the combination of a single set of teeth for both raking and tedding, a rake-head, a centrally-arranged lifting-wheel continuously revolving by power applied from either or both wheels, and mechanism for connecting the rake-head to said lifting-wheel at the will of the operator, to cause the elevation of the teeth for dumping under one condition of adjustment and for tedding under another condition of adjustment.

5. In a combined rake and tedder having a single set of teeth for both raking and tedding, an axle continuously revolving by power applied from either or both wheels, two lifting-wheels revolving with said axle, and two independent lock mechanisms connected to the rake-head, either of which may be operated at the will of the driver, the one for causing the elevation of the teeth in raking and the other the partial and automatic elevation of the teeth at regular intervals for tedding.

6. In a combined rake and tedder having a single set of teeth for both raking and tedding, the combination, with a lifting-wheel continuously revolving by power applied from either or both wheels, of a locking-dog held under constant engaging-pressure for tedding.

7. In a combined rake and tedder having a single set of teeth for both raking and tedding, the combination, with the continuously-revolving axle, of a rigid rake-head oscillating and journaled thereon and concentric therewith.

8. The combination, with the continuously-revolving axle and the rake-head journaled thereon, of a transverse shaft parallel with the axle, upon which is strung the eye-bearings which hold the teeth.

9. The combination, with the teeth, of an adjustable vibrating stripper-bar and an independently-adjustable guard-bar, whereby the teeth are prevented from springing over the strip bar.

10. The combination and arrangement of the supports S, arms T, adjustable guard-bar U, and adjustable stripper-bar V, substantially as and for the purpose specified.

11. The combination, with the teeth supported and adjustably held between the front and rear bars of a rocker-frame, of forward adjustable spring-guides whereby the tension of the springs can be regulated as desired.

12. The combination, with the rocking frame or rake-head and the forwardly and backwardly adjustable teeth secured thereto, of the spring-guides composed of the bolt $a$, spring $c$, recessed shell $d$, and nut $e$, the parts being constructed and applied in the manner and for the purpose specified.

13. The combination and arrangement of the axle A, hood D, lifting-wheels A' B', and locking-dogs C' E', substantially as set forth.

E. FOWLER STODDARD.

Witnesses:
   E. W. RECTOR,
   OTTO RICHTER.